//

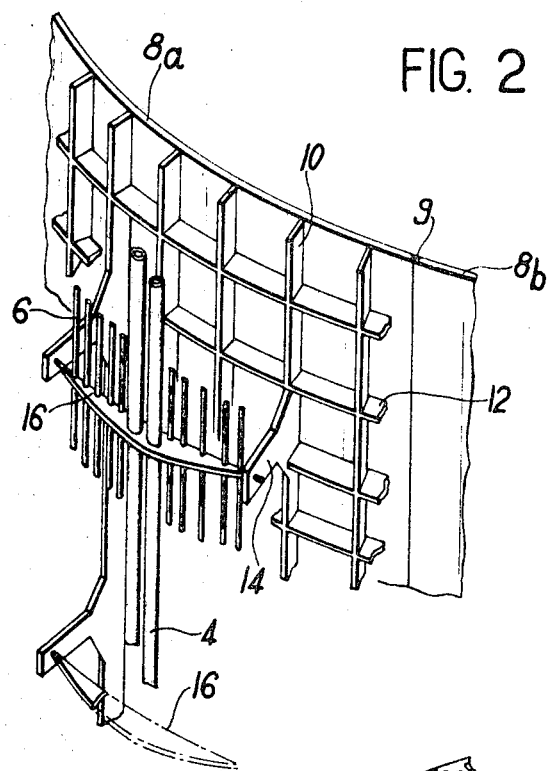
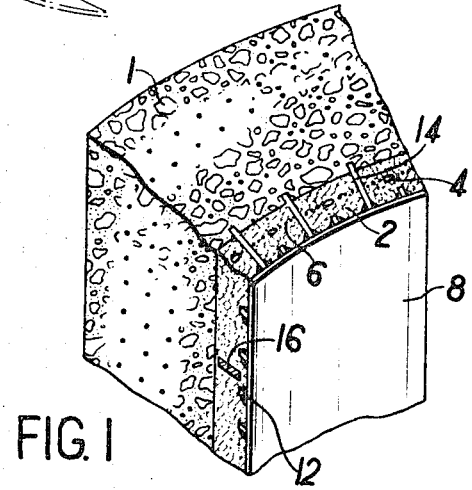

United States Patent Office 3,424,239
Patented Jan. 28, 1969

3,424,239
NUCLEAR REACTOR PRESSURE VESSEL
Michel Coudray, Saint-Leu-la-Foret, France, assignor to Société Indatom, Paris, France
Filed Apr. 25, 1967, Ser. No. 633,629
Claims priority, application France, Apr. 27, 1966, 59,368
U.S. Cl. 165—136  5 Claims
Int. Cl. F28f 13/00

ABSTRACT OF THE DISCLOSURE

A nuclear reactor pressure vessel comprising a prestressed concrete wall lined with a heat-insulating layer which is traversed by a cooling circuit and with a leaktight membrane formed by curved plates fabricated from a metal which is capable of withstanding direct contact with the fluid which is circulated through the reactor, said plates being welded together, stiffened by reinforcements and anchored either in the concrete or in the heat-insulating layer, the welded joints having previously been subjected to heat treatment which is similar to a prior treatment carried out on each of the plates.

---

Nuclear reactor pressure vessels are at present constructed of prestressed concrete which affords effective resistance to the pressure developed in a reactor core, said vessels being lined over their entire internal surface with a metallic shell or membrane which ensures leaktightness and especially imperviousness to the heat-transporting fluid.

In all cases in which the heat-transporting fluid is at a high temperature, precautions must be taken in order to limit the temperature of the concrete as well as the temperature differences between the internal face and external face of the concrete wall, and in order to maintain mechanical stresses within the lining membrane at an acceptable value.

The first two conditions can be satisfied by controlling the temperature of the internal face of the vessel by means of a system of ducts through which a cooling fluid is circulated at a temperature which is close to that of the surrounding atmosphere. If the duct lattice pitch is made sufficiently small and if provision is additionally made between the coolant ducts for preferential heat flow paths (fins, gridwork, etc.), economic arrangements are thus achieved which make it possible to maintain the concrete structure at a very acceptable temperature (for example in the vicinity of 50° C.) and to limit the difference in temperature between the internal face (or plane of the coolant duct system) and the external face to values (e.g. 10 to 50° C.) which are such that the thermal stresses produced within the structure remain within permissible limits.

So far as concerns the mechanical stresses in the lining membrane, it is important to limit the difference between the mean temperature of the membrane during operation of the reactor and its temperature at the time of construction. In fact, the lining membrane must be anchored at uniform intervals in the concrete wall in such a manner that it may closely follow the deformations of the structure under all conditions of vessel loading (no pressure; design prestress; design prestress, working pressure; design prestress, working pressure and circulation of coolant at high temperature; design prestress, no coolant) and at any moment during the service life of the pressure vessel, that is to say taking into account the shrinkage and creep characteristics of the concrete. The stresses to which the lining shell is subjected are therefore usually bi-dimensional and result mainly from the superposition of deformations imposed by the concrete vessel structure and restrained expansions of the lining shell.

The level of stresses arising from these two effects is sufficiently high and variable with time to call for special precautions. In all concrete pressure vessels of the type at present in existence, these precautions primarily consist:

In placing heat-insulating material between the heat-transporting fluid and the lining membrane, said heat-insulating material being usually at the same pressure as said fluid;

In providing good thermal "bridges" between the lining membrane and the cooling system mentioned above in order to draw-off heat which infiltrates through said heat-insulating material;

In providing a lining membrane of sufficient thickness to ensure a ready flow of heat laterally through said membrane towards said thermal bridges;

In selecting a material having relatively high heat conductivity in order to reduce the amplitude of spatial variations of temperature between two successive thermal bridges and therefore in bringing the value of the mean temperature of the lining membrane closer to its value at the level of said thermal bridges;

In ensuring sufficient anchoring of the lining membrane in the concrete wall in order to prevent any blistering or buckling which can give rise to high local stresses, substantial excursions in the plastic range, the possible development of cracking or fatigue failure and damage to the heat-insulating material.

The object of this invention is to reduce the number of these precautions insofar as the thermal properties of the lining membrane are concerned without thereby reducing the protection afforded by the concrete.

This invention relates to a nuclear reactor pressure vessel which comprises a wall of prestressed concrete, a rigorously smooth-walled lining membrane fabricated from a metal which possesses a high yield strength even at a relatively high temperature and a substantial ductile fracture strain, said lining membrane being directly in contact with the heat-transporting fluid which is circulated within the reactor and fabricated from plates which are assembled by welding, all welded joints being subjected to a heat treatment which is similar to the prior heat treatment of each plate and, between the lining membrane and the prestressed concrete wall, a heat-insulating layer which is traversed at the rear portion thereof by tubes for the circulation of a cooling fluid and membrane reinforcements which are applied against said heat-insulating layer.

The lining membrane can thus be designed from the outset to afford resistance to the maximum temperature of the heat-transporting fluid. The integrity of the membrane is no longer dependent on the retention of heat-insulating material. Moreover, the thermal bridges between the cooling system and the lining membrane are dispensed with, thereby removing the problem of heat transmission within said membrane.

According to a preferred embodiment, the lining membrane is fabricated from low-carbon nickel steel maintained in the martensitic phase and aged by heat treatment by virtue of the presence of suitable addition elements.

This alloy, which may be one of those derived from the process known as "Maraging" in fact retains its high yield strength even at relatively high temperatures and can therefore be maintained in contact with the heat-transporting fluid without any attendant danger. Moreover, the alloy referred to has a relatively substantial ductile fracture strain beyond the elastic limit, said alloy being consequently endowed with a sufficient degree of flexibility and ductility in the event of high local stresses which exceed normal values.

The lining membrane can be anchored either in the concrete or in the heat-insulating layer itself.

A number of other properties and advantages of the invention will also become apparent from the following detailed description of one embodiment which is given by way of example without implied limitation, reference being had to the accompanying drawings, in which:

FIG. 1 is a fragmentary view of a cylindrical pressure vessel in accordance with the invention;

FIG. 2 is a diagrammatic fragmentary view of the lining membrane anchoring system.

The nuclear reactor vessel structure which is shown in FIG. 1 comprises a wall 1 of prestressed concrete which serves as a biological shield against radioactive radiations emanating from the reactor core and is designed to afford resistance to the pressure developed within the reactor core. A heat-insulating layer 2 covers the internal surface of said wall 1 and is traversed in the vicinity of this latter by a cooling system comprising tubes 4 for the circulation of cooling fluid such as demineralized water, for example, and metallic rods 6 having high heat-conductivity which are placed between said tubes.

The heat-insulating layer 2 is isolated from the reactor core and more especially from the heat-transporting fluid which circulates within the core by means of a continuous smooth-walled lining membrane 8 which is anchored in the concrete structure 1. Said lining membrane is brought to a temperature which is substantially equal to that of said heat-transporting fluid and is formed of a metal possessing a high yield strength which it is capable of retaining even at high temperatures and a relatively substantial ductile fracture strain.

By way of example, the metal employed may be a steel of the type known as "maraging steels" as described in French Patent No. 1,315,270, that is to say a nickel steel having a very low carbon content and maintained in the martensitic phase, the martensite being aged by heat treatment by virtue of the presence of addition elements. This aging process has the effect of increasing the yield strength while retaining a relatively high ductile strain at fracture. Said aging process is carried out at moderate temperature and the transformation is not affected by the cooling rate; the process can therefore be readily performed in any location and on a construction site, for example. Steels of this type preferably contain approximately 18% Ni, less than 0.03% C and, depending on the grade desired, titanium, aluminum, cobalt, molybdenum, niobium or like elements which are suitable for the purpose of obtaining a steel which can readily be molded, forged or machined.

By way of example, the following composition has been employed:

| | Percent |
|---|---|
| Ni | 18 |
| Co | 8 |
| Mo | 5 |
| Ti | 5 |

After heat treatment, this steel has a yield strength of the order of 180 kgs./mm.$^2$ which it retains when it is brought to temperatures up to approximately 300° C. Above this value, this limit drops but still remains higher than 100 kgs./mm.$^2$ between 400 and 500° C., which is a normal temperature for a nuclear reactor cooling fluid. In point of fact, the stresses imposed by the deformation of the concrete are of the order of 20 kgs./mm.$^2$, which leaves at this temperature of 400–450° C. approximately 80 kgs./mm.$^2$ for absorbing the restrained expansions of a lining membrane 8 which is anchored to the concrete structure, without thereby departing from the elastic range. Moreover, the mean coefficient of expansion of this steel is $10 \times 10^{-6}$ C.$^{-1}$. The lining membrane therefore remains at this temperature of 450° C. within the elastic range.

In addition, the minimum elongation or ductile strain at fracture is 10%, thereby ensuring integrity of the lining membrane even in the event of accidental overstepping of the normal stress level.

As shown in FIG. 2, the lining membrane is constructed from a series of curved plates 8a, 8b which are welded to each other at 9 so as to form a continuous surface. Structural rigidity of the membrane is provided by a reinforcement structure consisting of either flat bar-iron, angle-iron or channel-iron members 10, 12 which are joined by welding in longitudinal and transverse directions to the membrane face which is adjacent to the concrete structure 1. A number of longitudinal structural members 10 are extended to the concrete structure by means of brackets 14 which support cross-bars 16 in which are fixed the tubes 4 for the circulation of cooling fluid as well as the array of rods 6 which is intended to draw-off the heat towards said fluid.

The support brackets 14 of the cooling circuit can be extended into the concrete 1 itself in order to serve as membrane-anchoring lugs. However, said brackets can also be limited to the heat-insulating layer when this latter is endowed with sufficient mechanical strength and is securely bonded to the concrete. The heat-insulating layer, which is never in contact with the heat-transporting fluid and is protected against any deteriorative effects produced by the lining membrane, can under the majority of circumstances be readily fabricated from a material which has good mechanical properties such as a refractory concrete.

The strengthening members 10–12 are preferably formed of the same metal as the lining membrane 8 and are welded to each plate 8a, 8b prior to heat treatment of these latter. The assembly of the pressure vessel can then be carried out as follows: plates 8a–8b having large dimensions such as, for example 1 m. x 5 m. and provided with strengthening members 10, 12 which leave the edges of said plates free are transported to the reactor construction site, then assembled together to form the lining membrane 8; this assembly is performed by welding at 9. After inspection and testing of the welded joints 9, the membrane zones which correspond to these welds are subjected to a local heat treatment which is similar to the treatment previously carried out on each plate in the workshop, namely a heat treatment at a temperature between 450 and 500° C., for a period of approximately three hours, whereupon the strengthening members are joined to each other.

The system of cross-bars 16 which are made of plain carbon steel is secured, for example, by means of bolts to the anchoring brackets 14 which support the rods 6 for the purpose of drawing-off the heat towards the cooling circuit, said rods 6 having been previously mounted on the cross-bars if necessary. The cooling tubes 4 are then welded to said cross-bars 16.

The heat-insulating layer 2 can then be installed. In a preferred embodiment, said heat-insulating layer is formed of a material of the refractory concrete type which is chosen with a view to achieving the most satisfactory compromise between the requisite properties of strength, plasticity and low heat conductivity.

Temporary shuttering is then preferably disposed behind the strengthening members 10, 12 and the cooling system, and the concrete is then placed between said shuttering and the lining membrane.

The thermal barrier system which is formed by the membrane and the heat-insulating layer being thus in its final position, the temporary shuttering which may prove necessary for the purpose of placing the refractory concrete is then removed, the concrete surface is roughened if necessary and the prestressed concrete construction work can then proceed, the refractory concrete layer being used as internal shuttering. The internal reinforcements which may have to be placed in position in order to provide the membrane with the necessary rigidity while the refractory concrete is being placed can either be withdrawn or retained during placement of the concrete structure, depending on the stresses which are anticipated. By way of alternative, the assembly of the lining membrane elements, the positioning of the cooling system and heat-insulating layer can be carried out at the same time as the prestressed concrete construction, provided that a sufficient lead is maintained both in time and in height between the different stages of erection.

It is readily apparent that it would also be possible to contemplate the attachment of the heat-insulation material separately on each plate prior to formation of the lining membrane. In this case, the periphery of each membrane plate should be left free so as to permit of welding followed by local heat treatment, heat-insulating seals being positioned (that is to say cast in the case of refractory concrete) on these uncovered zones prior to placing the prestressed concrete. There is thus obtained a pressure vessel in which the concrete is effectively protected against heat by the heat-insulating layer and shielded from the cooling circuit whilst the lining membrane is maintained at a high but uniform temperature, thereby limiting the mechanical stresses to which said membrane is subjected. The presence of this "hot" membrane makes it possible to mount internal equipment as close to the wall as may be desired, no space being required any longer for the heat-insulating material, and the heat-transporting fluid which is in contact with the continuous and smooth surface is accordingly permitted to circulate at high velocity.

The design and construction of the pressure vessel according to the invention are also facilitated by the isolation of the heat-insulating layer which permits the choice of an economic material and even a material having good mechanical strength which may also be capable of supporting the lining membrane, by the further possibility of carrying out on site not only the erection of the lining membrane and heat-insulating layer but also the heat treatment of the weld zones, the mechanical strength with which said zones are thus endowed being similar to that of the remainder of the lining membrane.

The design and construction of vessel penetrations are therefore also simplified.

As will be readily understood, a number of different modifications could be made in the mode of execution which has just been described without thereby departing from the scope of the invention. For example, in certain cases, it can be an advantage to make use of grades of steel which are hardened in the austenitic phase and converted to martensite by annealing at approximately 800° C. A number of other grades can also be employed especially for utilization at the very high operating temperatures of reactors of the heavy water or advanced gas-cooled type.

What is claimed is:

1. A nuclear reactor having a pressure vessel comprising a pressure resisting wall of prestressed concrete, a heat insulating layer against the internal face of said wall, tubes for the circulation of cooling fluid passing through said layer, a smooth leak-tight lining membrane in contact with said heat insulating layer on one side and in contact with the heat transporting fluid circulated within the reactor on the other side, and membrane reinforcements for said membrane passing into said heat insulating layer, said lining membrane comprising welded metallic plates, all welded joints being subjected to a heat treatment which is similar to the prior heat treatment of each plate and possessing the same substantial ductile fracture strain as the plates and the same yield strength as the plates higher than 100 kg./mm.$^2$ at a temperature of about 300 to 500° C.

2. A pressure vessel in accordance with claim 1, wherein the lining membrane is fabricated from low-carbon nickel steel maintained in the martensitic phase and aged by heat treatment by virtue of the presence of addition elements selected from the group consisting of molybdenum, titanium, cobalt, aluminum and niobium.

3. A pressure vessel in accordance with claim 1, wherein the lining membrane can be anchored either in the concrete or in the heat-insulating layer.

4. A pressure vessel in accordance with claim 1 which comprises an array of rods which possess good heat conductivity, said array being mounted in the heat-insulating layer between the tubes.

5. A pressure vessel in accordance with claim 4, wherein the tubes and rods are supported by the lining membrane anchoring members.

References Cited

UNITED STATES PATENTS 3,320,969   5/1967   Gordon _____ 176—87

OTHER REFERENCES

Auslegeschrift 1,098,114 German patent, Jan. 26, 1961, J. Bellier et al., 5 pp., 4 sh. 176—87.

Auslegeschrift 1,221,370 German patent, July 21, 1966, Beliaev, 3 pp., 2 sh. 176—87.

Auslegeschrift 1,210,496 German patent, Feb. 10, 1966, Banowski, 2 pp., 2 sh. 176—87.

REUBEN EPSTEIN, *Primary Examiner.*

U.S. Cl. X.R.

52—224, 249, 378; 176—87, 58; 165—169